US005949687A

United States Patent [19]

Emigh et al.

[11] Patent Number: 5,949,687

[45] Date of Patent: Sep. 7, 1999

[54] COMPUTER CONTROLLED APPARATUS AND METHOD FOR INSERTING MAIL INTO ENVELOPES

[75] Inventors: Jonathan D. Emigh; Raymond P. Porter, both of Somerset; Motaz M Qutub, Rancho Cordova, all of Calif.

[73] Assignee: Bell & Howell Mail Processing Systems, Durham, N.C.

[21] Appl. No.: 09/065,342

[22] Filed: Apr. 23, 1998

Related U.S. Application Data

[62] Division of application No. 08/720,837, Oct. 3, 1996, Pat. No. 5,823,521.

[51] Int. Cl.$^6$ ........ G06F 7/00

[52] U.S. Cl. ........ 364/478.08

[58] Field of Search ........ 364/478.08, 478.01; 270/58.06

[56] References Cited

U.S. PATENT DOCUMENTS

| | | | |
|---|---|---|---|
| 2,325,455 | 7/1943 | Williams | 270/58.06 |
| 4,577,848 | 3/1986 | Hams | 53/284.3 |
| 4,734,865 | 3/1988 | Scullion et al. | 364/478.08 |
| 4,903,456 | 2/1990 | Meur | 53/69 |
| 4,987,547 | 1/1991 | Rabindran et al. | 364/478 |
| 5,647,583 | 7/1997 | Emigh et al. | 270/52.04 |
| 5,823,521 | 10/1998 | Emigh et al. | 270/58.06 |

*Primary Examiner*—William E. Terrell
*Assistant Examiner*—Khoi H. Tran
*Attorney, Agent, or Firm*—Jenkins & Wilson, P.A.

[57] ABSTRACT

An apparatus and method for computerized control of a "Phillipsburg-type" mail insertion machine. The mechanical timing and drive mechanisms of the prior art inserter are replaced with a programmable computer, solenoid valves, and pneumatic cylinders, or other suitable drivers. The computer's software includes a plurality of programmed look-up tables. An operational delay look-up table includes electro-mechanical lag times for the pneumatically driven stations/sub-assemblies of the inserter. Also provided are look-up speed tables, which include start and stop angles for actuation of each of the pneumatic cylinders. A first look-up speed table includes actuation data appropriate for operation of the machine within a relatively slow range of speeds. Four additional look-up speed tables provide correct actuation data for successively higher speed groups, up to 10,000 insertion cycles per hour. An alternative method of determining actuation data is disclosed, requiring ongoing and updated calculations of appropriate values based precisely upon the machine's actual operational speed.

4 Claims, 13 Drawing Sheets

FLOW CHART OF ADAPTIVE SPEED CONTROL USING PREDETERMINED SPEED TABLES

FLOW CHART OF ADAPTIVE SPEED CONTROL USING REPETITIVELY CALCULATED SPEED TABLES

| |
|---|
| Fig. 5A |
| Fig. 5B |
| Fig. 5C |

ENVELOPE FLAP OPENER
70
71
118
ENVELOPE FLAP SPRAYER
86
WATER IN
87
84
119
83
116
POWER SUPPLY
INSERT GRIPPER JAW 1...N
32
28
32
114
36
33
34
OPTICALLY ISOLATED ELECTRONIC RELAY CONTROL BOARD
INSERT STATION JAM SENSORS 1...N
132
CLUTCH OUTPUT JAM SWITCH
133
OUTPUT CONVEYOR CONTROL
136
START/STOP/JOG SYSTEM CONTROL SWITCHES
137
69
MAIN ENVELOPE SUCTION CUPS
138
MAIN DRIVE MOTOR
MOTOR CONTROL
16
132
139
HOPPER SUCTION CUP 1...N
37
117
VACUUM PUMP
141
123

77
121
78
ENVELOPE OPENER

ENVELOPE REJECTOR
93
92
124
93
89
ENVELOPE FLAP GRIPPER
77
74
126
77
73
AIR PUMP
ENVELOPE INSERTION FINGERS
82
81
127
82
79
104
INSERT HOPPER SEPARATOR FOOT
51
48
128
51
INSERT HOPPER SUCKER BAR
42
39
129
42
INSERT TRACK HOLD DOWN FOOT
62
61
131
62

LOW SPEED TABLE 1 (0-2 K CYCLES PER HOUR)

| STATION/SUB-ASSEMBLY | MAIN DRIVE SHAFT ROTATION ANGLE IN DEGREES | |
|---|---|---|
| | ON | OFF |
| 1 ENVELOPE FLAP SPRAYER | 200 | 340 |
| 2 INSERT VACUUM CUP | 110 | 240 |
| 3 ENVELOPE VACUUM CUP | 320 | 30 |
| 4 ENVELOPE FLAP OPENER | 200 | 350 |
| 5 ENVELOPE OPENER | 15 | 120 |
| 6 GRIPPER JAW | 0 | 108 |
| 7 ENVELOPE REJECTOR | 180 | 160 |
| 8 SUCKER BAR | 115 | 205 |
| 9 INSERTION FINGERS | 50 | 110 |
| 10 INSERT HOLD DOWN FOOT | 13 | 123 |
| 11 SEPARATOR FOOT | 155 | 225 |
| 12 ENVELOPE FLAP GRIPPER | 0 | 180 |

*Fig. 8*

HIGH SPEED TABLE 5 (8-10 K CYCLES PER HOUR)

| STATION/SUB-ASSEMBLY | MAIN DRIVE SHAFT ROTATION ANGLE IN DEGREES | |
|---|---|---|
| | ON | OFF |
| 1 ENVELOPE FLAP SPRAYER | 180 | 320 |
| 2 INSERT VACUUM CUP | 70 | 220 |
| 3 ENVELOPE VACUUM CUP | 280 | 10 |
| 4 ENVELOPE FLAP OPENER | 180 | 330 |
| 5 ENVELOPE OPENER | 355 | 100 |
| 6 GRIPPER JAW | 345 | 87 |
| 7 ENVELOPE REJECTOR | 160 | 140 |
| 8 SUCKER BAR | 45 | 125 |
| 9 INSERTION FINGERS | 340 | 30 |
| 10 INSERT HOLD DOWN FOOT | 338 | 83 |
| 11 SEPARATOR FOOT | 125 | 201 |
| 12 ENVELOPE FLAP GRIPPER | 345 | 165 |

*Fig. 9*

ROTATIONAL ANGLES OF
LOW AND HIGH SPEED ON/OFF
CONTROL SIGNALS FOR INSERT VACUUM CUP

FLOW CHART OF ADAPTIVE SPEED CONTROL USING PREDETERMINED SPEED TABLES

FLOW CHART OF ADAPTIVE SPEED CONTROL USING REPETITIVELY CALCULATED SPEED TABLES

COMPUTER CONTROLLED APPARATUS AND METHOD FOR INSERTING MAIL INTO ENVELOPES

CROSS REFERENCE TO RELATED APPLICATION

This application is a divisional of allowed U.S. patent application Ser. No. 08/720,837, filed Oct. 3, 1996, now U.S. Pat. No. 5,823,521.

FIELD OF THE INVENTION

The invention generally relates to machines which collate individual sheets of paper from a plurality of stacks to form an insertion packet, transport the packet to an insertion station, and then insert the packet into envelopes and seal them for mailing. More specifically, the invention pertains to improvements in a machine known as a "Phillipsburg-type" mail inserter.

BACKGROUND OF THE INVENTION

The most common and widely used high speed mail inserters are of the "Phillipsburg-type", having initially been introduced in the late 1920's. U.S. Pat. No. 2,325,455 discloses such a mail insertion device. These mail inserters typically include a plurality of "picking stations", each having a respective stack of sheet items, or mail inserts, and a picker arm. The picking stations are arranged in a row, partially overlying a conveyor. The picker arm includes a jaw at its lower end, adapted to grip a sheet, or insert, previously segregated from the stack. The picker arm is mounted for rotation about its upper end, and reciprocates from a first position, where the jaw grips an individual sheet, to a second position, where the jaw releases the sheet over the conveyor. The conveyor is successively indexed beneath each picking station, for collating the proper number and types of sheets, or mail inserts. After the sheets are properly assembled into an insert packet, the packet is transported to an insertion station, and inserted into an open envelope.

In addition to the aforementioned picking stations, conveyor, and insertion station, the "Phillipsburg-type" machines include numerous other sub-assemblies and components. These additional items are used for manipulating the stack of sheets, handling, preparing, and sealing the envelopes, and rejecting defectively inserted envelopes. Cams, chains, gears, drive shafts, and electro-mechanical switches are used to actuate and control, overall operation and timing of the machine. Each of the various stations, sub-assemblies, and components, must be timed to actuate in proper sequence, to prevent jamming, insertion faults, or envelope sealing faults.

Currently available inserter machines use numerous cams, located on a main drive shaft, as the principal means for drive and timing control. If the machine is running at low speeds, say 200 insertions per hour, the cams are set in a first position, or rotational angle, on the main drive shaft. If higher operational speeds are desired, a skilled operator or mechanic will manually advance and reset the rotational angle of the cams, to a second position. This requirement for mechanically repositioning the cams, and other components which require timing adjustments for different operational speeds, is time consuming and reduces throughput for the machine. And, sometimes, to avoid the readjustment process completely, an operator will simply leave the cams in a middle-range setting, which does not work in optimum fashion either for low or high speed operation.

SUMMARY OF THE INVENTION

The present invention eliminates the majority of cams, levers, and mechanical slide valves used in the prior art mail inserter machines, and replaces them with a plurality of fast-acting drive cylinders, or rams. The drivers are preferably actuated by pneumatic pressure, but other drivers based upon hydraulic or electromagnetic systems could be used as well. The pneumatic drive cylinders are individually controlled by a plurality of respective solenoid air valves, a computer, and programmable software. The operator sets the desired operating parameters by programming the software, and the computer controls individual functions and the overall operation of the machine. The computer accomplishes this by sending appropriately timed electronic control signals to the solenoids and other control systems. The pneumatic drivers are thereby properly actuated in timed relation, depending both upon the selected operating parameters and upon the electro-mechanical response time of the driven station, sub-assembly, or component.

By controlling the machine's stations, subassemblies, and associated components independently, synchronization of the functions they perform is accomplished automatically by the computer and its software, in accordance with a selected operational speed. This eliminates much of the setup time required between different insertion jobs and ensures maximum efficiency and flexibility in inserter machine operation.

The present invention also provides new operational features in mail inserter machines, with its computer gathering, storing and processing current information about the operating parameters of each driven station, subassembly, and component. The computer software disclosed herein further makes logic decisions and issues individualized control signals, which, for example, allow custom, programmed operation of particular picking stations, or the outsorting of envelopes containing defective insert packets.

The invention further includes a touch screen video monitor which is interfaced with the computer, so that all operational parameters can be set by touch programming. Such operating parameters would include the machine speed in cycles per hour, the size of the envelope, and the number and operational modes for each picking station used for the particular job. Then, in preparation for start up, the device goes through an initialization process, in which the gripping jaw in each picking station is calibrated for the proper insert thickness. Thereafter, the software automatically optimizes and times the operation of all functions, irrespective of ongoing changes in the selected speed of operation.

BRIEF DESCRIPTION OF THE DRAWINGS

FIG. 8 is low speed look-up table (Table 1), used when the inserter is operating in the range of 0–2000 cycles per hour;

FIG. 9 is high speed look-up table (Table 5), used when the inserter is operating in the range of 8000–10,000 cycles per hour;

DETAILED DESCRIPTION OF THE PREFERRED EMBODIMENT

Figures 1, 1A:
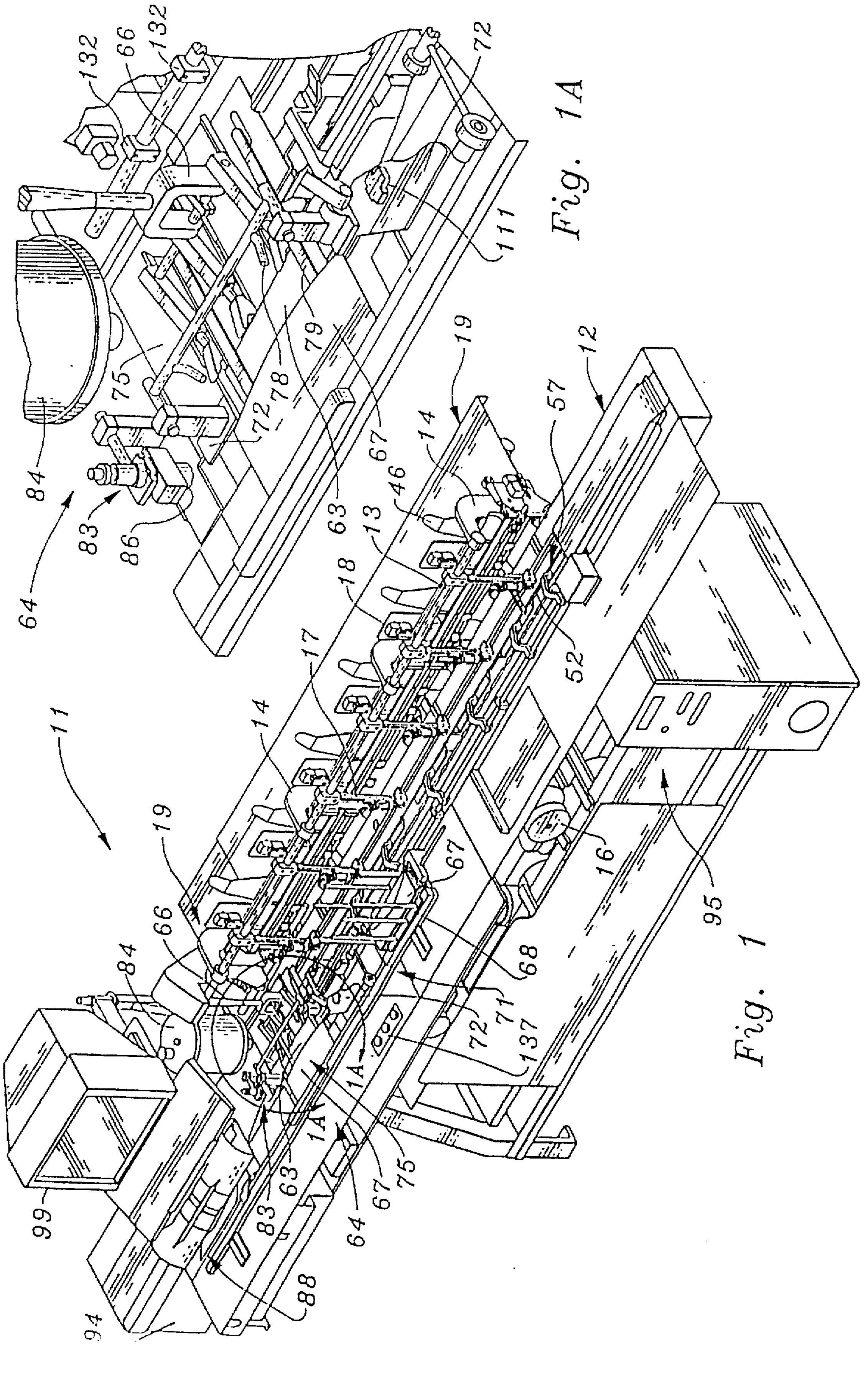
FIG. 1 is a right front perspective of the mail inserting apparatus of the present invention.
FIG. 1A is a fragmentary detail of the inserter station, defined by the area encircled by the line 1A—1A, in FIG. 1.

Turning now to the drawings, FIG. 1 shows a mail inserter machine 11, made in accordance with the teachings of the present invention. Certain aspects of the present invention relating particularly to the overall operation of the machine 11 and several of its stations, are disclosed in our pending application Ser. No. 08/540,384, filed Oct. 6, 1995, entitled, "Apparatus And Method For Singulating Sheets And Inserting Same Into Envelopes". The disclosure of Ser. No. 08/540,384 is hereby expressly incorporated by reference into the present application.

Inserter 11 includes a frame 12 upon which the majority of the components to be described herein are mounted. A rotatable drive shaft 13 extends across the upper portion of frame 12. Shaft 13 is journalled through and supported by a plurality of angled arms 14, extending upwardly from frame 12. Shaft 13 is driven by a motor 16, and an associated crank mechanism (not shown), for reciprocating movement through a predetermined arc of rotation.

The inserter includes a plurality of picker arms 17, each having an upper end 18 attached to the common drive shaft 13. The arms 17 are arranged in spaced relation along shaft 13, at a respective picking station 19. Although the inserter machine 11 disclosed herein includes six such picking stations, the precise number is not critical, and will depend upon the requirements for the particular application.

Figure 4:
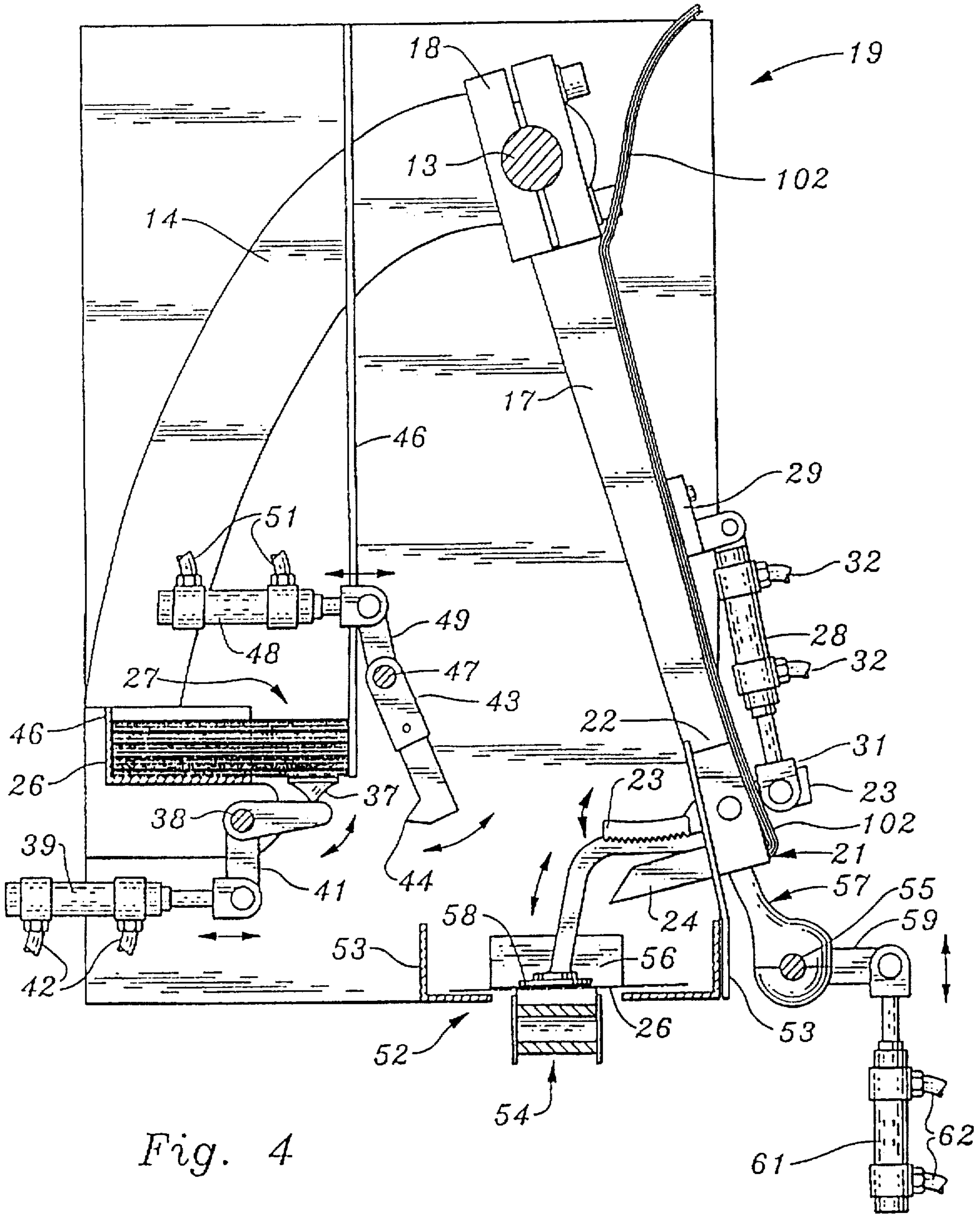
FIG. 4 is a fragmentary, side elevational view of a picker arm assembly, taken on the line 4—4, in FIG. 3.

In the picking station 19 shown in FIG. 4, a gripper jaw assembly 21 is provided at a lower end 22 of the picker arm 17. Assembly 21 includes a movable gripper jaw 23, which is pivotally attached to the lower end 22 of arm 17. Assembly 21 also includes a stationary foot 24, extending in perpendicular fashion from the lower end 22. One end of jaw 23 and foot 24 cooperate to grasp an individual sheet, or insert 26 of film or paper material from a stack 27. This insert "picking" operation is described greater detail, in U.S. Pat. No. 5,647,583.

To actuate jaw 23, alternatively, from a closed position to the open position shown in FIG. 4, a pneumatically driven cylinder 28 is provided. An upper end of cylinder 28 is pivotally attached to a bracket 29 on arm 17. A lower end of cylinder 28 includes a clevis 31, pivotally attached to the other end of gripper jaw 23. Cylinder 28 is driven in reciprocating fashion by pneumatic pressure provided from cylinder lines 32. A four-way solenoid valve 33 directs pressure from a supply line 34, in alternating fashion through cylinder lines 32. [see, FIGS. 5A–5C]. Electrical line 36 conducts control signals which actuate solenoid valve 33 and jaw 31, in synchronism with the rotational position of a main drive shaft, as will be discussed in more detail herein.

A hopper suction cup 37 is mounted on a rotatable insert hopper sucker bar 38, which extends through the array of picking stations 19. A pneumatic cylinder 39 is pivotally connected to a lever 41, which in turn is attached to the bar 38. Cylinder 39 is driven in reciprocating fashion by alternating pneumatic pressure provided through cylinder lines 42. Sucker bar 38 is thereby rotated about its axis, from a first position (shown in FIG. 4) to a second position. In the first position, suction cup 37 is rotated into flush engagement with a lowermost insert 26, whereupon vacuum is applied through the cup, to grip an underside of the insert. Thereafter, cylinder 39 is retracted, rotating sucker bar 38 and vacuum cup 37 in clockwise fashion to a second position, segregating insert sheet 26 from the stack 27.

An insert hopper separator foot 43, including a tip 44, is provided in adjacent relation to insert hopper 46. Foot 43 is mounted on a rotatable, separator foot drive bar 47, which extends through all of the picking stations 19. In this way, as with sucker bar 38, one common rotatable structure actuates a plurality of operable elements attached thereto. For that purpose, a pneumatic cylinder 48 and a lever 49 are provided, for rotating drive bar 47 from a first position (shown in FIG. 4), to a second, advanced clockwise position. Cylinder lines 51 provide pneumatic pressure selectively to the ports of cylinder 48, for extending or withdrawing the cylinder's drive rod. In the first position, cylinder 48 is fully withdrawn, thereby retracting foot 43 and making room for suction cup 37. After the suction cup has gripped the end of the insert and both have been rotated into a second position, foot 43 is rotated into its second, extreme clockwise position. Now, tip 44 is interposed between an upper side of the insert and the remaining stack. Consequently, when the vacuum forces are subsequently released from cup 37, tip 44 maintains the right extreme portion of the segregated insert in a downwardly curving direction, for subsequent grasping by gripper jaw assembly 21.

The picker arm is then rotated in clockwise fashion so that the end of segregated insert 26 is located between jaw 23 and foot 24. After the jaw is closed upon the insert and the foot, the arm 17 is rotated in counter-clockwise fashion, pulling the insert free from the stack. When the arm 17 approaches the position shown in FIG. 4, the jaw assembly is opened, allowing the insert to fall into an elongated, insert track, or conveyor 52. Track 52 includes a pair of lateral guides 53, a drive chain 54, and a plurality of push fingers 56. The vertical portions of the guides act laterally to restrain the inserts, while the horizontal portions support the inserts from below. Drive chain 54 is indexed, or actuated in intermittent fashion, causing fingers 56 to advance accordingly. In this manner, the conveyor stops at each picking station 19, for the addition of another sheet or insert. Inserts are thereby collated into insert packets having the desired number and kind of sheets or inserts.

To secure the inserts 26 within the track 52 during successive track advancements, an insert track hold down foot 57 is provided. An elongated, horizontal bar 58 (see, FIGS. 3 and 4) is included on one end of foot 57, to extend along a respective segment of the track, between adjacent stations. The other end of foot 57 is attached to a rotatable drive shaft 55, extending across all of the picking stations 19. As with the previously mentioned suction cup and separator foot sub-assemblies, the hold down foot sub-assemblies are all attached to the common drive shaft 55, and move in unison therewith. To accomplish that purpose, one end of a lever arm 59 is fixed to drive shaft 55. A pneumatic cylinder 61 is pivotally attached to the other end of arm 59, for raising and lowering foot 57 in response to alternating pneumatic pressure applied through cylinder lines 62. Foot 57 is raised during the insert picking operation, while the track is stationary, and a new insert is placed within the track. Then, before the track is advanced or indexed to a new position, the foot is lowered over the insert, to maintain it securely within the track.

While the preferred and disclosed method of supporting and driving the suction cup, separator foot, and hold down foot sub-assemblies is through a mechanically shared drive shaft or bar, each of these sub-assemblies could be individually actuated and independently controlled. It would simply require individual pneumatic cylinders driving the components, and respective solenoid valves interconnected to the computer.

Complete insert packets 63 are sequentially transported on the track 52, from the last picking station to an insertion station 64 (see, FIG. 1A). A pusher fork 66 at station 64 has an upper end attached to shaft 13, and includes three lower prongs adjacent a longitudinal edge of an insert packet 63. Fork 66 reciprocates in synchronism with picker arms 17, to translate insert packet 63 toward a waiting empty envelope 67.

A stack of empty envelopes 67, all with their flaps and rear sides facing upwardly, is stored in an envelope hopper 68. A plurality of envelope vacuum cups 69, is used to singulate an individual envelope from the bottom of the stack. Cups 69 are arranged in ganged relation, and are movable from a first raised position, vacuum engaged with the front side of a lowermost envelope, to a second lowered position, releasing the segregated envelope to an envelope conveying mechanism (not shown). As the envelope is moved by the conveyor, the envelope passes by an envelope flap opener, or puffer 70, where it is exposed to a transverse blast of air, emitted by a pair of nozzles 71. A curved, hold-down bar 72 engages a leading edge of the partially opened envelope flap, and unfolds the entire flap backwardly, into a flat and fully open position. Thereafter, bar 72 maintains the envelope flap in this fully open position, until the envelope reaches the insertion station 64.

Figure 2:
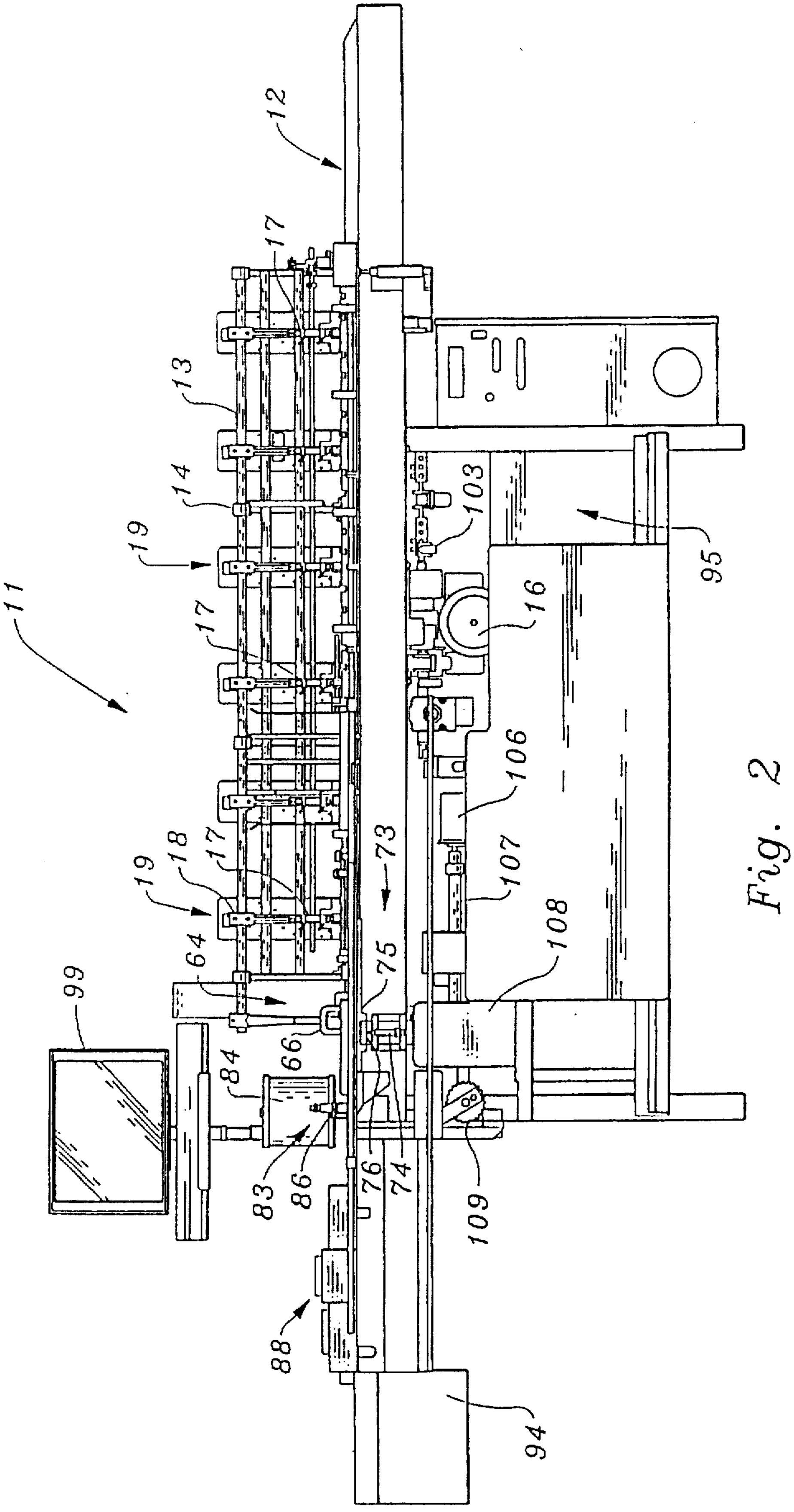
FIG. 2 is a front elevational view of the apparatus.

An envelope flap gripper 73, shown in FIG. 2, includes a pneumatic cylinder 74 and a pinching foot 76. Cylinder lines 77 provide alternating pneumatic pressure to drive cylinder 74, urging the pinching foot against or away from, the envelope flap. When pinching foot 76 is in a raised, extended position, it secures the envelope flap against an insertion plate 75. The envelope is thus held securely in place for the insertion process.

Next, an envelope opener, or puffer 77, including a pair of nozzles 78, provides a blast of air across the rear side or face of the envelope. Filling the interior volume of the envelope with air, the opener thereby urges the envelope panels apart. A pair of envelope insertion fingers 79 is also provided, to enter the opened envelope, and maintain the envelope in an open configuration for insertion of the packet 63. To extend and retract fingers 79, a reciprocating pneumatic cylinder 81 is used. Cylinder lines 82 provide alternating pneumatic pressure to drive cylinder 81 and the attached insertion fingers.

With the envelope opener and the insertion fingers holding the envelope fully open, pusher fork 66 transfers insert package 63 into the envelope. Following retraction of the fingers and deactivation of the air blast, the leading edge of the loaded envelope is thereafter gripped by a dog on a chain conveyor (not shown), and transported past an envelope flap sprayer 83. A tank 84 provides a ready source of water for a sprayer nozzle 86. A sprayer line 87, interconnected to a source of pneumatic pressure, drives the sprayer nozzle to wet the adhesive on the exposed envelope flap.

The envelope is finally transported to a rotary wheel 88, known in the trade as a "step-stage turnover assembly". This mechanism is commercially available from the Bell & Howell Company, which manufactures a number of suitable models, including the Model A312. Wheel 88 includes a plurality of clamps, radially extending from its periphery. When the envelope approaches the turnover assembly, an open clamp is already in position to receive the envelope. After the envelope has stopped, the clamp grips the flap region of the envelope, sealing the flap over an underlying portion of the rear envelope panel. Then, the wheel 88 is indexed into a new position, advancing toward the rear portion of the frame 12. Meanwhile, another clamp is rotated into position for the next envelope. A typical wheel 88 has eight clamps, so substantially continuous sealing and transport operations are accomplished. It should also be noted that the envelope undergoes a rear side to front side turnover in this process, so by the time the envelope is discharged from the wheel 88, the front of the envelope is facing upwardly.

An envelope rejector 89 is included on the rear portion of frame 12. A gate 91, pivotally mounted along a transverse, downstream edge, is connected to a pneumatic cylinder 92. Cylinder lines 93 provide alternating pneumatic forces to drive cylinder 92 in reciprocating fashion. When cylinder 92 is in an extended position, a transverse, upstream edge of gate 91 is raised, diverting an incoming envelope downwardly into a reject collection bin 94. When cylinder 92 is in a retracted position, gate 91 is in a horizontal, lowered position, and envelopes simply pass over, to be offloaded onto a downstream conveyor.

Having discussed the overall operation of the machine 11, we can now direct attention the specific electrical, pneumatic, and vacuum components used to implement this operation. Making particular reference to FIGS. 5A–C, a computer 95 is provided, including a CPU 96, look-up tables 97, and an I/O card 98. Computer 95 is of standard design, including built-in peripheral controllers, such as hard and floppy disk controllers, a serial port controller, and a printer port controller. It also includes adequate RAM to support the control software described herein. Touch screen monitor 99, shown in FIGS. 1 and 2, allows the operator to program the computer and its software, to determine operational parameters for the insert machine. Monitor 99 also displays the operational status of the insert machine, including visual reports from individual sub-assemblies and fault detection sensors.

The I/O card 98 is included to drive external devices with control signals from the CPU, and to receive input signals from various sensors and switches and direct those signals to the CPU. The I/O card has a number of low voltage, low current interconnections to sensors, detectors, and switches.

An auto "double detect" sensor 101 is provided within each gripper jaw assembly 21, for a respective picking arm 17. Sensor 101 is used to detect the distance between the gripper jaw 23 and the foot 24, at selected times during the reciprocating cycle of picking arm 17. By analyzing the output of sensor 101, delivered to the I/O card over a line 102, the computer can determine whether a "miss", a "double", or a normal insert pick has occurred. The "miss" fault condition occurs when the gripper jaw assembly fails to grasp an insert during its picking cycle; the "double" fault condition occurs when the gripper jaw assembly picks two or more inserts during its picking cycle. The output of sensor 101 also provides confirmation when the gripper jaw assembly is empty, and in a fully closed position. The components and the process used to carry out this "double detect" feature are described greater detail, in U.S. Pat. No. 5,647,583.

An air pressure monitor switch 103, constantly samples the pneumatic pressure provided by air pump 104. Serious damage can occur to the components of the various stations and sub-assemblies in the event of a catastrophic loss of air pressure. If that occurs, CPU 96 will effect an immediate shut down of the machine, including disruption of power to main drive motor 16.

An "absolute" optical encoder 106, is included at the end of a main drive shaft 107. By "absolute", it is meant that the output of the encoder corresponds at all times to the exact rotational position of the shaft 107. This is to be contrasted to a conventional optical encoder, which has a registration index at only one rotational position. As a consequence, upon initial startup, a conventional encoder cannot provide positional readings until the shaft has been rotated to reach that index.

The present invention also includes a gear box 108, having an input driven by motor 16. One of the outputs of gear box 108 drives shaft 107, and other output drives sprocket 109. Sprocket 109 is connected to various chains and other sprockets (not shown), to power the picking arm drive shaft 13, and the numerous conveyors and tracks used to transport inserts and envelopes along frame 12.

Figures 5, 5A:
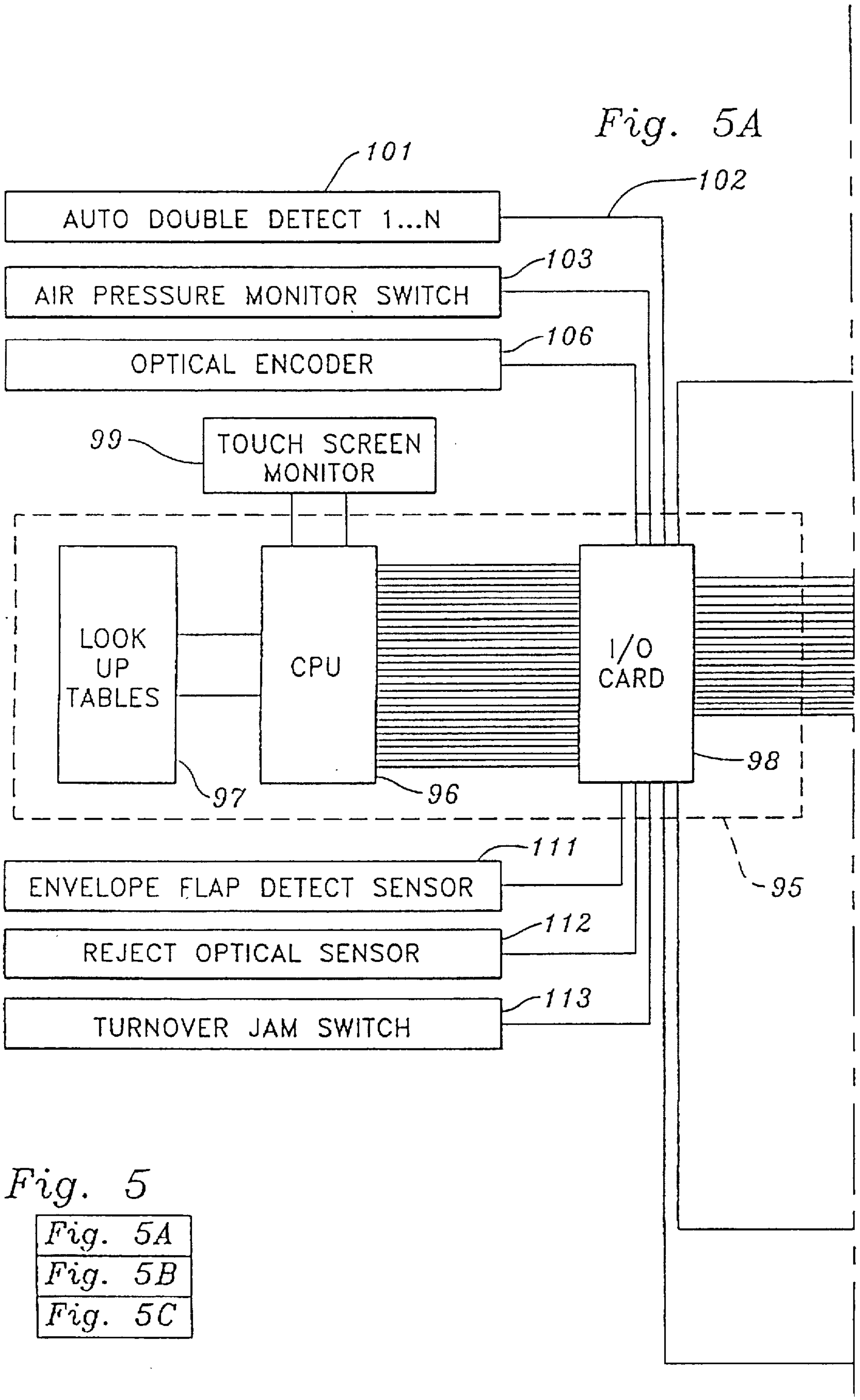
FIGS. 5A through 5C depict a simplified schematic of the apparatus, showing the electrical, pneumatic, and vacuum components, and all interconnecting lines.
Figure 5B:
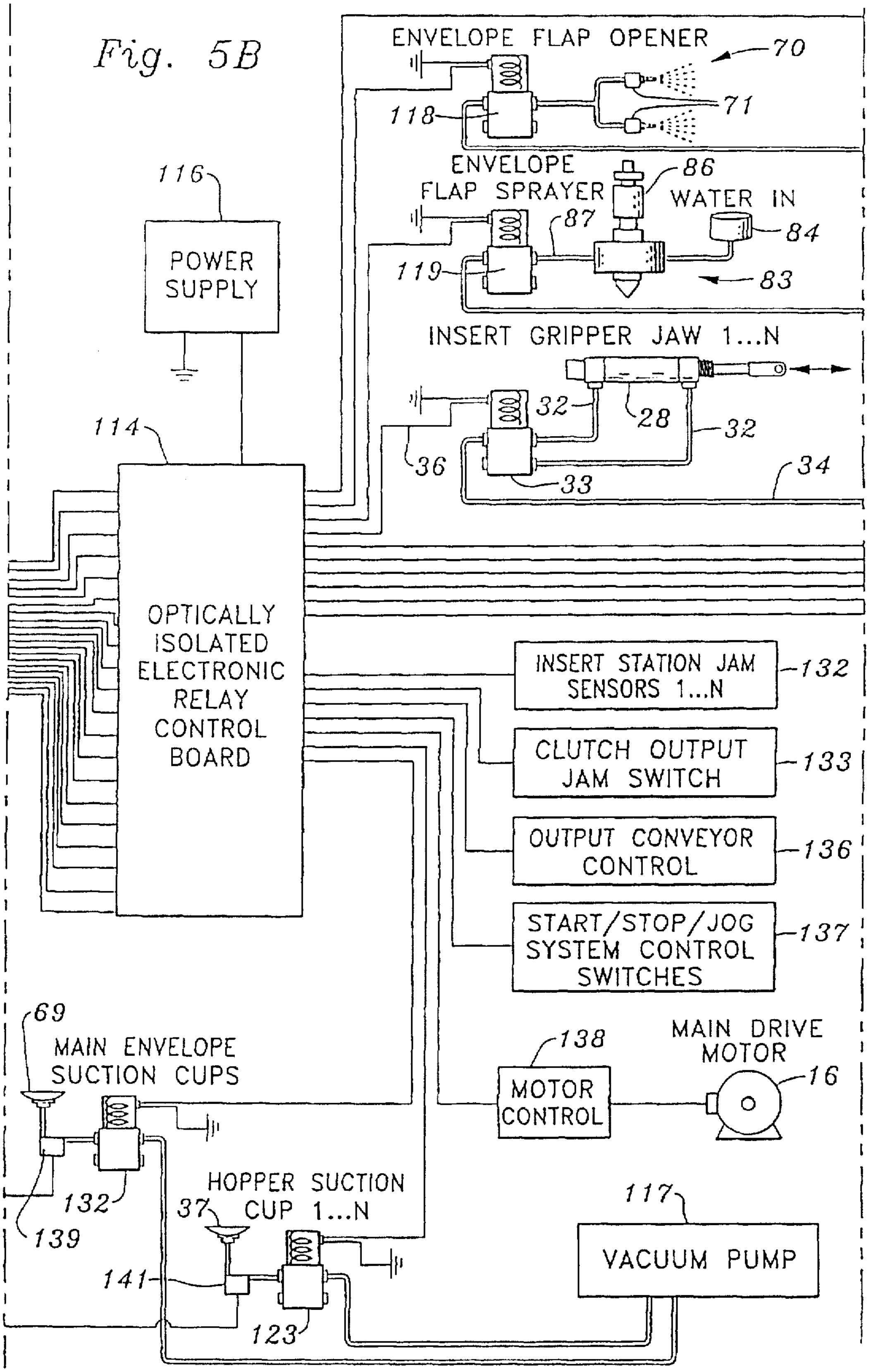
Figure 5C:
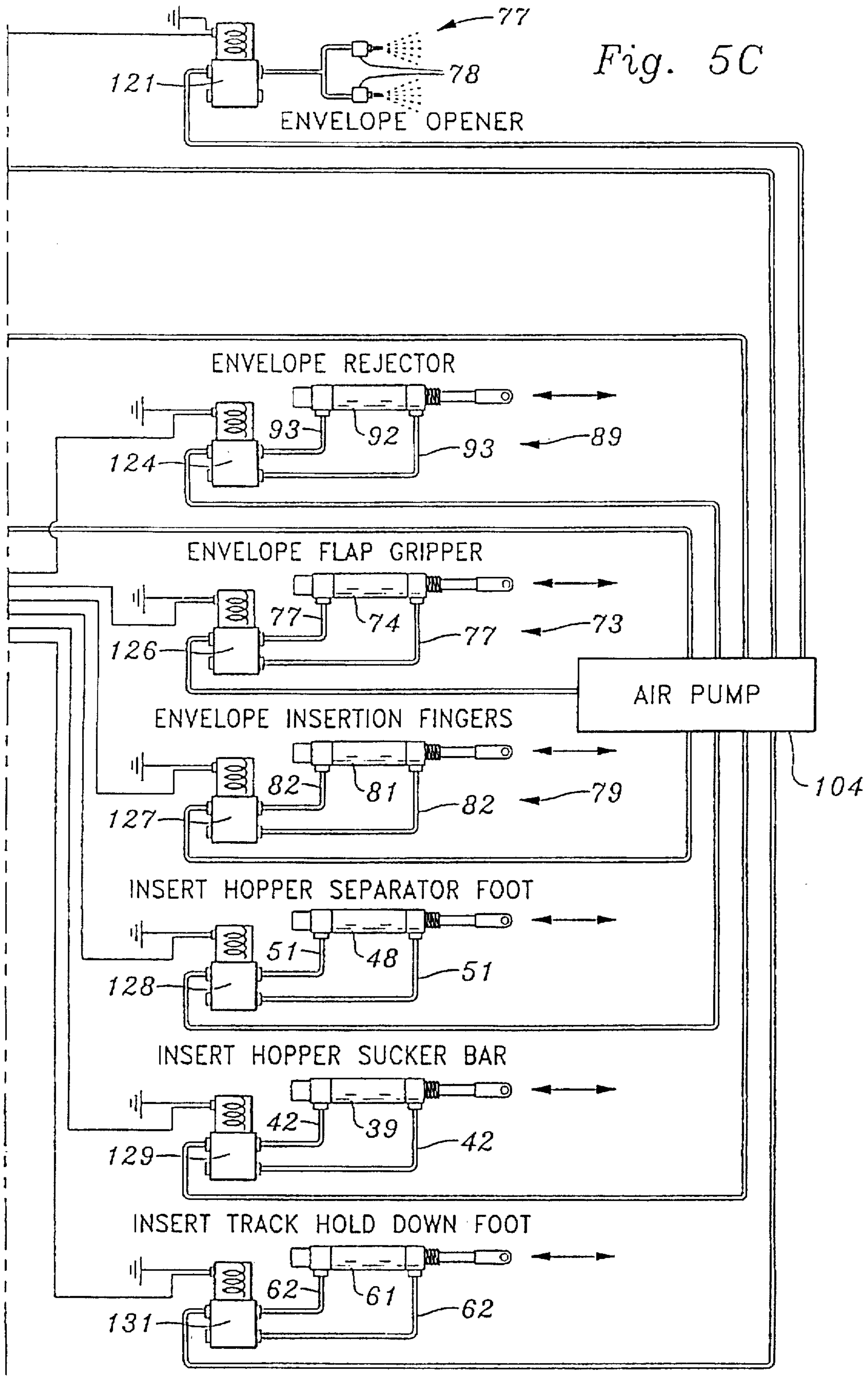

As with the prior art "Phillipsburg-type" inserter machine, the inserter of present design has a 360 degree timing cycle, determined by the rotational position of the main drive shaft 107. That is to say, each of the stations, sub-assemblies, and components of inserter machine 11 which operates in timed relation, is activated and deactivated in accordance with repetitive cycles of rotation of shaft 107. However, rather than mechanically driving these timed operations with cams, gears, and electro-mechanical switches on or responsive to the main drive shaft, the absolute optical encoder 106 merely provides electrical pulses. These pulses are used by the computer to produce electrical control signals issued in precise, timed relation, and which determine "on-off" operational periods for selected stations, sub-assemblies, and components. Accordingly, as shown in FIG. 5A, the output of optical encoder 106 is connected to I/O card 98 of computer 95.

Figure 3:
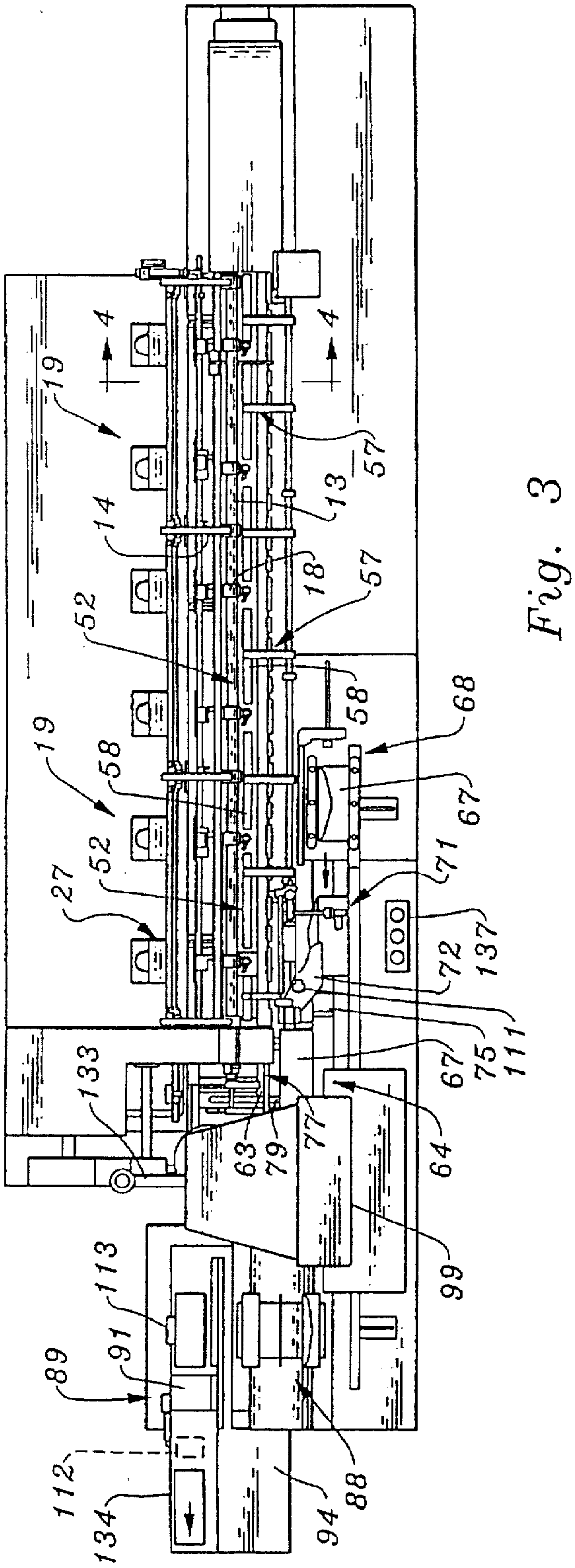
FIG. 3 is a top plan view of the apparatus.

Making reference to FIG. 3, an envelope flap sensor 111 is included on hold down bar 72. The output of sensor 111 is fed into I/O card 98. This sensor is sampled by the computer 95, during a period when an envelope with its flap folded out in an open position, should be passing under bar 72. If the presence of an envelope flap is not detected, it means that the envelope hopper is empty, or a flap fold-back operation was not successful, and a fault condition is flagged for the operator.

Two other detector units are shown in FIG. 3, one to assist in proper operation of the envelope rejection system, and the other to detect whether a mechanism has jammed. A reject optical sensor 112, located within the entry to reject collection bin 94, provides a trigger signal to the computer that an envelope which has been "flagged" for rejection, has in fact been diverted into the bin 94. This trigger signal clocks a counter, which totals the number of rejections during a particular job. The trigger signal also enables a display on the monitor 99, showing the operator what type of fault condition exists with respect to the envelope or its contents. Such fault conditions would include, for example, a "double" or a "miss" detected by auto double detect sensor 101, or a "miss" detected by envelope flap detect sensor 111. A turnover jam switch 113 detects a fault condition with wheel 88, or other components of the envelope turnover assembly. Electrical outputs from both sensor 112 and switch 113 are connected directly to I/O card 98, as shown in FIG. 5A.

The I/O card also includes inputs and outputs connected to an optically isolated electronic relay control board 114. Since many of the solenoid control valves and motors included in the inserter machine require high voltage and current, control board 114 provides protective isolation between circuits to these components and the low voltage CPU 96. Control board 114 provides the additional benefit of preventing coupling of electrical noise generated by the high voltage/high current devices to the CPU. A power supply 116 provides electrical power for the output circuits of the control board 114.

The operation of twelve stations/sub-assemblies is determined by control signals issuing from control board 114. Each of these stations/sub-assemblies includes a solenoid valve, capable of directing pneumatic pressure to a pneumatic drive cylinder, a nozzle, or a sprayer, or directing a vacuum to a vacuum cup, in response to an electrical control signal. It will be noted from FIG. 5C, that air pump 104 has a plurality of output lines, leading to respective stations/sub-assemblies which require pneumatic pressure for operation. Also, a vacuum pump 117, includes a plurality of vacuum lines, one leading to the main envelope suction cups 69, and the others leading to respective hopper suction cups 37 (1 . . . N).

Envelope flap opener 70 includes a three-way solenoid valve 118, which directs pneumatic pressure upon command to nozzles 71. The envelope flap sprayer 83 also has a three-way solenoid valve 119, actuating sprayer nozzle 86 with pneumatic pressure, upon receiving a control signal. Similarly, envelope opener 77 has a three-way solenoid valve 121, providing pneumatic pressure to nozzles 78 in response to a control signal. Three-way solenoid valves 122 and 123 are also provided to control the application of vacuum, respectively, to suction cups 69 and 37.

The solenoid valve 33 used to actuate each insert gripper jaw assembly, is a four-way valve, providing reciprocating action in cylinder 28. Other stations/sub-assemblies which require reciprocating action also include four-way solenoid valves. Thus, envelope rejector 89 has a four-way solenoid valve 124, envelope flap gripper 73 has a four-way solenoid valve 126, envelope insertion fingers have a four-way solenoid valve 127, and the pneumatic cylinders driving the insert hopper separator feet, the insert hopper sucker bar, and the insert track hold down feet, are respectively driven by four-way solenoid valves 128, 129, and 131.

It is apparent that through the use of a restorative spring, or the like, each of these stations/sub-assemblies requiring reciprocating drive could be actuated by a three-way valve. And, although it is preferred herein to use pneumatically driven cylinders, other equivalent driving systems, based upon hydraulic and electromagnetic principles, could be employed to perform the identical functions.

Relay control board 114 includes interconnections with a number of other components, as well. A pair of insert station jam sensors 132 is included to inspect an envelope, immediately after an insert packet has been inserted therein and the envelope opener has been deactivated. As shown in FIG. 1A, sensors 132 "look" across each end of the envelope after the insertion process, to determine whether the envelope is buckled, or bulging upwardly, indicating a jam or insert malfunction. Sensors 132 are of the reflective type, including both an illuminating element and a detector element within each assembly.

A clutch output jam switch 133, identified in FIG. 3, is included to deactivate the main drive motor 16, in the event that a predetermined amount of torque is applied to the output shaft of the drive clutch (not shown). The motor driving an output conveyor 134 (see, FIG. 3), is governed by an output conveyor control 136. The inserter machine also includes on its frame 12, a group of start/stop/jog system control switches 137. Lastly, a motor control 138 is provided, to direct electrical power to main drive motor 16. All of these components are connected to relay control board 114, providing information to and/or receiving control signals from the computer's CPU 96.

It should also be noted that a vacuum sensor 139 and a vacuum sensor 141 are directly connected to the I/O card 98. Sensors 139 and 141 are series-connected within the vacuum lines leading, respectively, to suction cups 69 and 37 [see, FIG. 5(*b*)]. The computer constantly monitors the inches of vacuum within these vacuum lines, and issues an alert to the operator in the event of a failure or other malfunction.

One of the important features of the present inserter machine 11, is its ability to operate efficiently and effectively, over a wide range of speeds, without time-consuming mechanical adjustments to cams, gears, and the like. The present invention eliminates these mechanical adjustments, and places the inserter machine under computer control. To accomplish this task, the operation of certain critical stations and sub-assemblies of the inserter, was put under computer driven, adaptive control. This feature compensates for the particular electro-mechanical time lag which each of these assemblies and components exhibits, for extension and retraction. By appropriately adjusting the occurrence of the on-off control signal used to initiate and terminate each electro-mechanical function, perfect timing at any speed is maintained without operator intervention.

Figure 6:
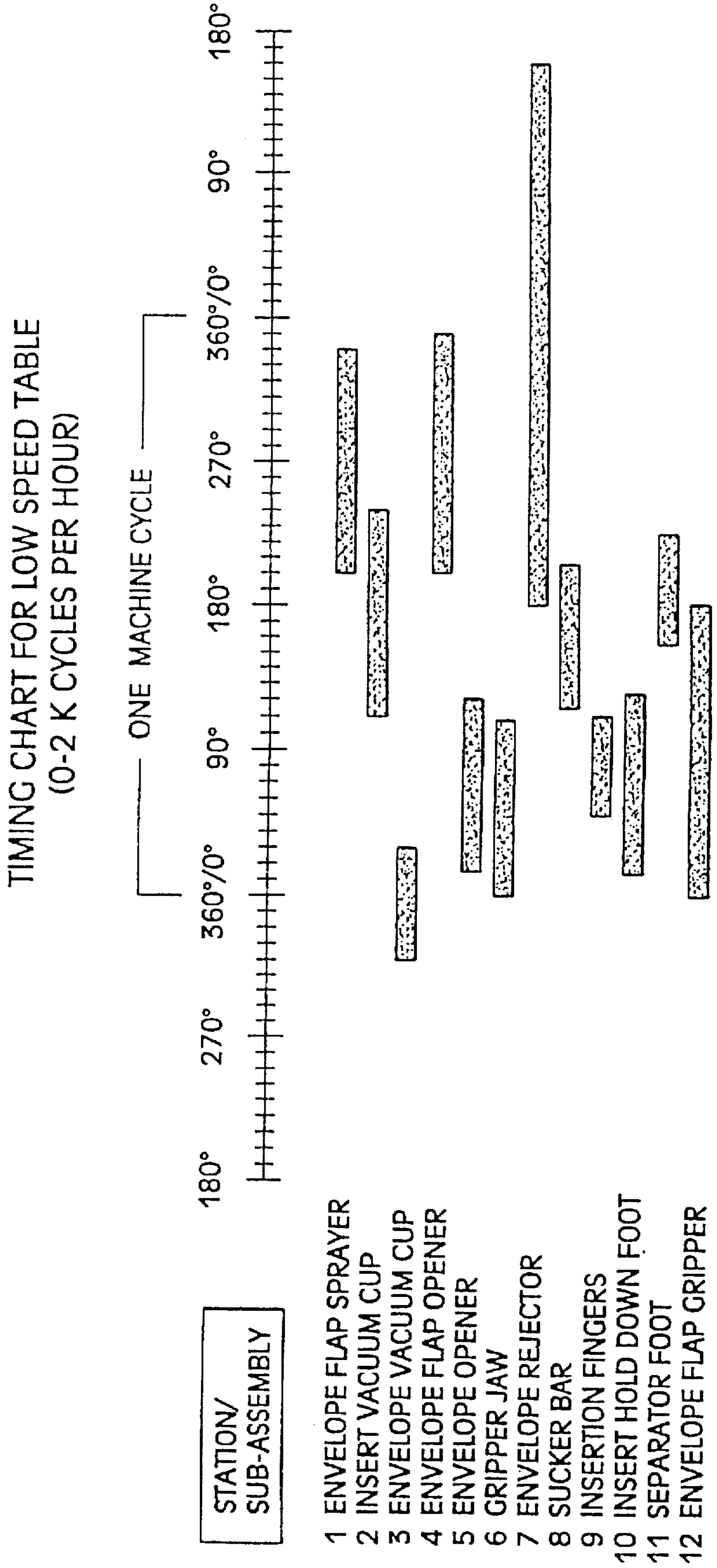
FIG. 6 is a low speed timing chart, showing the occurrence of on/off control signals, in degrees of main shaft rotation, for twelve stations/sub-assemblies.
Figure 7:
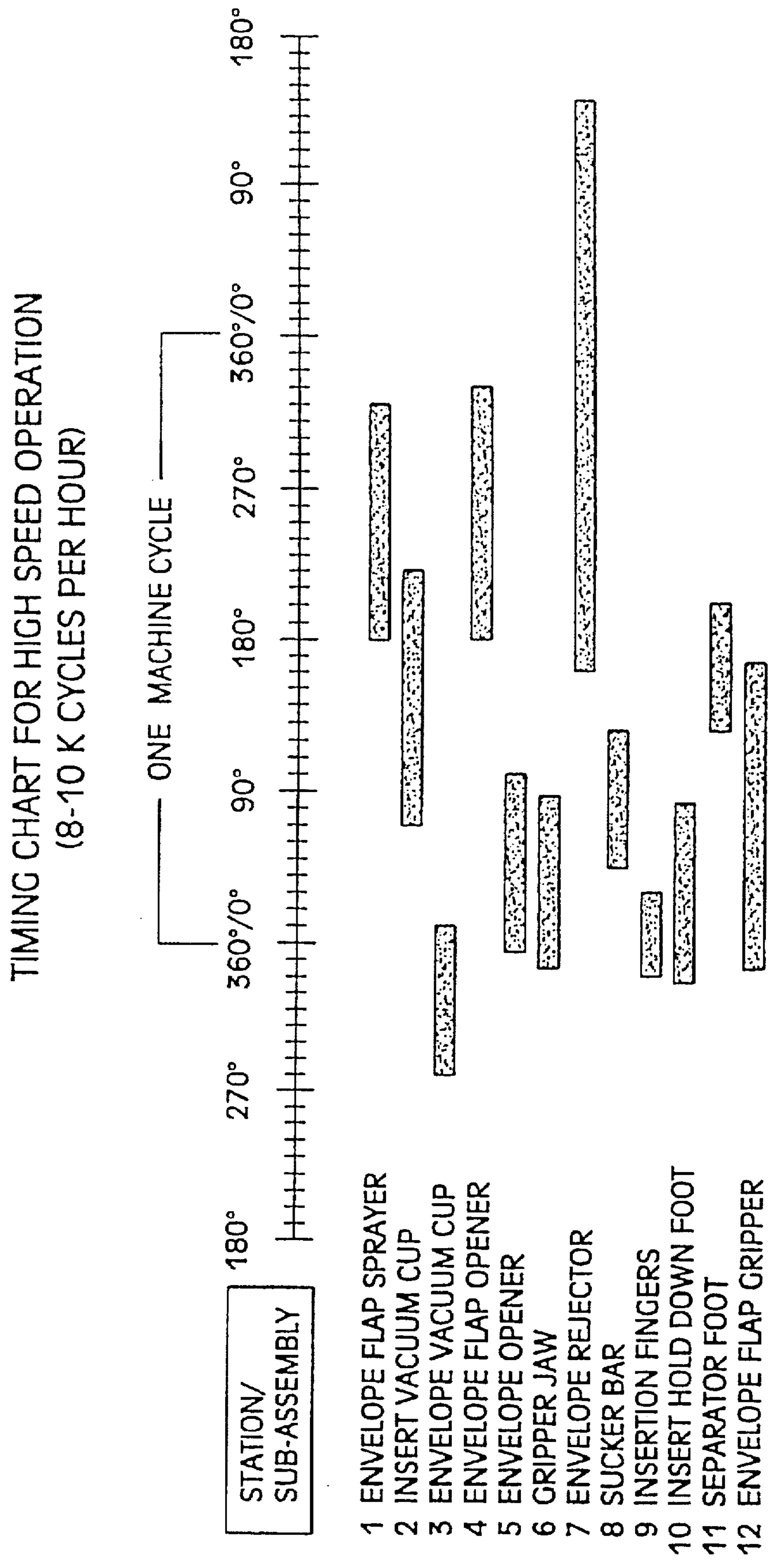
FIG. 7 is a high speed timing chart, showing the occurrence of on/off control signals, in degrees of rotation, for twelve stations/sub-assemblies.

As explained earlier, the timing relationships of all functions in the present invention are defined by their respective positions within a machine cycle. Each machine cycle has a starting position defined as 0 degrees, and an ending position completed 360 degrees later, at the same exact position. FIG. 6 shows a low speed timing chart for the control signals which determine the operation of the listed station/sub-assemblies. The shaded bars represent the occurrence and duration of the individual on-off control signals. For example, the control signal for the envelope flap gripper turns on at 0 degrees and turns off at 180 degrees. Several of the control signals begin before, or end after, the defined machine cycle. The envelope vacuum cup control signal turns on at 320 degrees within the previous cycle, and turns off at 30 degrees within the present cycle. The envelope rejector control signal turns on at 180 degrees within the present cycle, and turns off at 160 degrees within the next cycle.

At low speeds, within the range of approximately 0 to 2,000 cycles per hour, the occurrence of the control pulse and completion of the particular function are almost simultaneous. For example, when the "on" control pulse is sent to the envelope flap sprayer, water is sprayed on the envelope flap at 200 degrees within the machine cycle. And, when the control pulse is turned "off", water spray ceases at 340 degrees within the machine cycle. Thus, notwithstanding the fact that an electro-mechanical delay, or lag, exists with respect to the operation of each of these stations/sub-assemblies, it is so negligible at slow speeds that it can be ignored.

The control software for the computer is programmed with "look-up" speed tables, which include a start angle (control signal on) and a stop angle (control signal off), for each of the twelve stations/sub-assemblies listed in FIG. 6. A first, low speed look-up table, listed in tabular form in FIG. 8, shows the on and off angular positions for the control signals. This data corresponds to the timing chart data which is presented in FIG. 6 in graphical form. It should be noted that additional look up tables may be created from this first speed table, adding timing compensation for different sized envelopes and inserts. For example, a longer envelope has longer adhesive portion on its sealing flap; thus, the duration of the control signal for the envelope flap sprayer may be lengthened from its indicated 140 degrees, to approximately 150 degrees. Similarly, if the insert size is changed, the occurrence and duration of the gripper jaw control, or actuation signal may be modified accordingly. As operational speeds of the inserter machine increase, the electro-mechanical lag, or delay time for starting and stopping the various stations and sub-assemblies becomes a significant factor. Time is required for the solenoid to open the valve, for air to travel to the cylinder, for the cylinder to move, and for the first phase of the operation to be completed. Then, for the stop, or "off" part of the cycle, similar but not necessarily identical time delays are encountered. Unless operation of the stations and sub-assemblies is adapted to the new, higher speed, the timing of critical sequences in insert and envelope handing and processing will be skewed, and malfunctions will occur. Therefore, to provide adaptive control of these critical sequences, additional look-up speed tables are used, each tailored to ensure proper machine operation within a predetermined range of speeds.

To make these additional tables, empirical measurements are first made to determine the both the "on" and the "off", electro-mechanical response times for each of the twelve stations/sub-assemblies made the subject of adaptive control. Using instruments, the times in milliseconds (ms) from the occurrence of the control pulse to complete extension of mechanical travel, and from the cessation of the control pulse to complete retraction of mechanical travel, can be measured. For the present stations/sub-assemblies, it has been determined that these times range from approximately 10 to 100 ms. These values, in milliseconds, are stored in an Operational Delay Table.

Irrespective of machine speed, these operational delays remain constant. However, to maintain the same end result in the sequential operations of the stations/sub-assemblies, adjustments must be made in the "on" and "off" times of the control pulses. For that purpose, calculations are made, taking into consideration both the measured electro-mechanical delays, and certain predetermined operational speeds of the machine. Then, these values are stored in the look-up speed tables, for use by the computer in issuing the control pulses.

The calculations for the speed tables require that an adaptive, adjustment factor be determined, in degrees, assuming a fixed lag time and a selected speed. If we assume that the measured lag time for extension of the insert vacuum cup is 44.4 ms, and the proper actuation angle at slow speed (1000 cycles/hour) is 110 degrees, what is the proper "On" Control Pulse Angle at 9,000 cycles/hour?

1. Calculating first, the speed (S1) in cycles/ms:

$$S1=9{,}000\ \text{cycles/hr}\times 1\ \text{hr}/60\ \text{min}\times 1\ \text{min}/60\ \text{sec}\times 1\ \text{sec}/1000\ \text{ms}=0.00250\ \text{cycles/ms}$$

2. Converting the speed S1, into a speed S2, expressed in degrees/ms:

$$S2=0.00250\ \text{cycles/ms}\times 360\ \text{degrees/cycle}=0.9\ \text{degree/ms}$$

3. Calculating next, the adaptive, adjustment factor in degrees, at 9,000 cycles/hr:

$$44.4\ \text{ms time lag}\times 0.9\ \text{degree/ms}=40\ \text{degrees}$$

4. Calculating finally, the new, "On" Control Pulse Angle, based upon adaptive adjustment:

$$\text{New "On" Control Pulse Angle}=110\ \text{degrees}-40\ \text{degrees}=70\ \text{degrees}$$

This new calculated value of 70 degrees, is then stored in the appropriate speed table, which in this case is a High Speed Table, calculated for operation in the range of 8,000 to 10,000 cycles/hr (see, FIG. 9). It has been determined that for machine operation between 0 and 10,000 cycles, only five tables need to be calculated and stored, for proper operation. Each table is designed for use within a 2,000 cycle/hr range. Thus, there are speed tables for 0–2000 cycles/hr, 2,000–4,000 cycles/hr, 4,000–6,000 cycles/hr, 6,000–8,000 cycles/hr, and 8,000–10,000 hr. Table 1, for low speed operation, covers the 0–2,000 cycles/hr range, and requires no adaptive adjustment calculation, as discussed above. Each of the four remaining tables requires calculations, assuming a mid-range speed for each table calculation. Thus, as shown above, the calculation for the high speed table, assumes a mid-range speed of 9,000 cycles/hr. It has been determined experimentally that such a mid-range calculation provides entirely satisfactory results over the designated table range of 8,000–10,000 cycles/hr.

The next value which must be calculated is the angle at which the control pulse must be turned off, to ensure that the vacuum cup completes retraction at the same time it did when operated at a slow speed. In this case, the measured retraction time lag for the insert vacuum cup is 22.2 ms, half the time required for the extension process.

1. Calculating first, the adaptive, adjustment factor in degrees, at 9,000 cycles/hr:

$$22.2\ \text{ms time lag}\times 0.9\ \text{degree/ms}=20\ \text{degrees}$$

Figure 10:
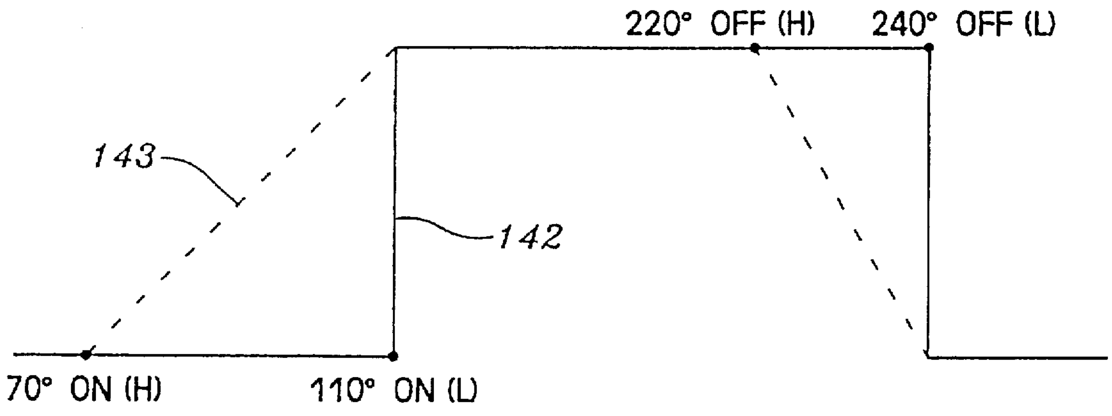
FIG. 10 is a graph showing the timing relationship of on/off control signals, at both high and low speeds, for the insert vacuum cup.

2. Calculating next, the new, "Off" Control Pulse Angle, based upon adaptive adjustment:

New "Off" Control Pulse Angle=240 degrees−20 degrees=220 degrees This value of 220 degrees, is then stored in the high speed table, for determining when during the inserter machine's cycle, the control pulse to the insert vacuum cup is turned off. FIG. 10 graphs a comparison of "on" and "off" control pulses, for insert vacuum cup actuation, at both low and high speeds. Low speed operation is represented by the solid line 142, and high speed operation is represented by the broken line 143. Owing to the dissimilar lag times between extension and retraction of the cup, the "on" and "off" angles for the control pulse are accordingly adjusted, during high speed operation.

The process of calculating "on" and "off" control pulse angles is continued for each of the twelve stations/sub-assemblies at 9,000 cycles/hr, 7,000 cycles/hr, 5,000 cycles/hr, and 3,000 cycles/hr, to complete the four look-up speed tables requiring adaptive adjustment. After the five tables have been stored, the inserter machine is ready for operation.

Figure 11:
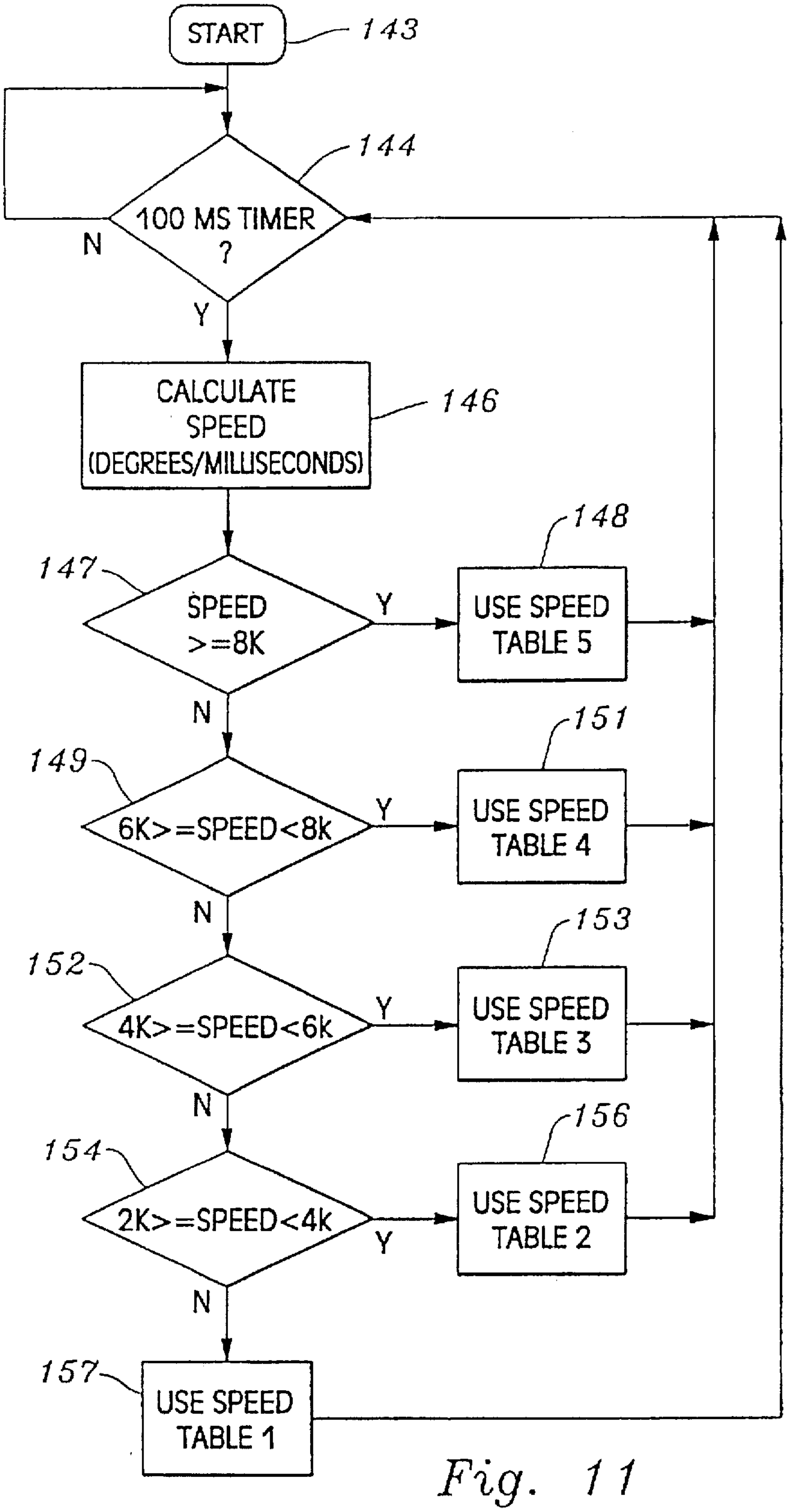
FIG. 11 is a flow chart illustrating the adaptive speed control feature of the present invention, using predetermined speed look-up tables.

Making reference now to FIG. 11, a flow chart showing use of the predetermined speed tables is depicted. At the start 143, a 100 ms timer 144 is enabled by the computer. For a period of 100 ms, the computer samples the output of the absolute optical encoder 106, and then calculates 146 the speed. A determination 147 is made whether or not the speed exceeds 8,000 cycles/hr. If it does then the computer accesses 148 Speed Table 5 (shown in FIG. 9), and uses those values for determining control signals as long as the speed remains greater than 8,000 cycles/hr.

If the speed does not exceed 8,000 cycles/hr, a determination 149 is made whether the speed is between 6,000 and 8,000 cycles/hr. If so, the computer accesses 151 Speed Table 4, and uses those values. If not, a determination 152 is made whether the speed is between 4,000 and 6,000 cycles/hr. If this is confirmed, the computer accesses 153 Speed Table 3, and issues control signals based upon those values. If not, the computer makes a determination 154 whether the speed is between 2,000 and 4,000 cycles/hr. If it is, the computer accesses 156 Speed Table 2, and uses those values. In the event the speed does not lie within that range, the computer accesses 157 Speed Table 1 (shown in FIG. 8).

Figure 12:
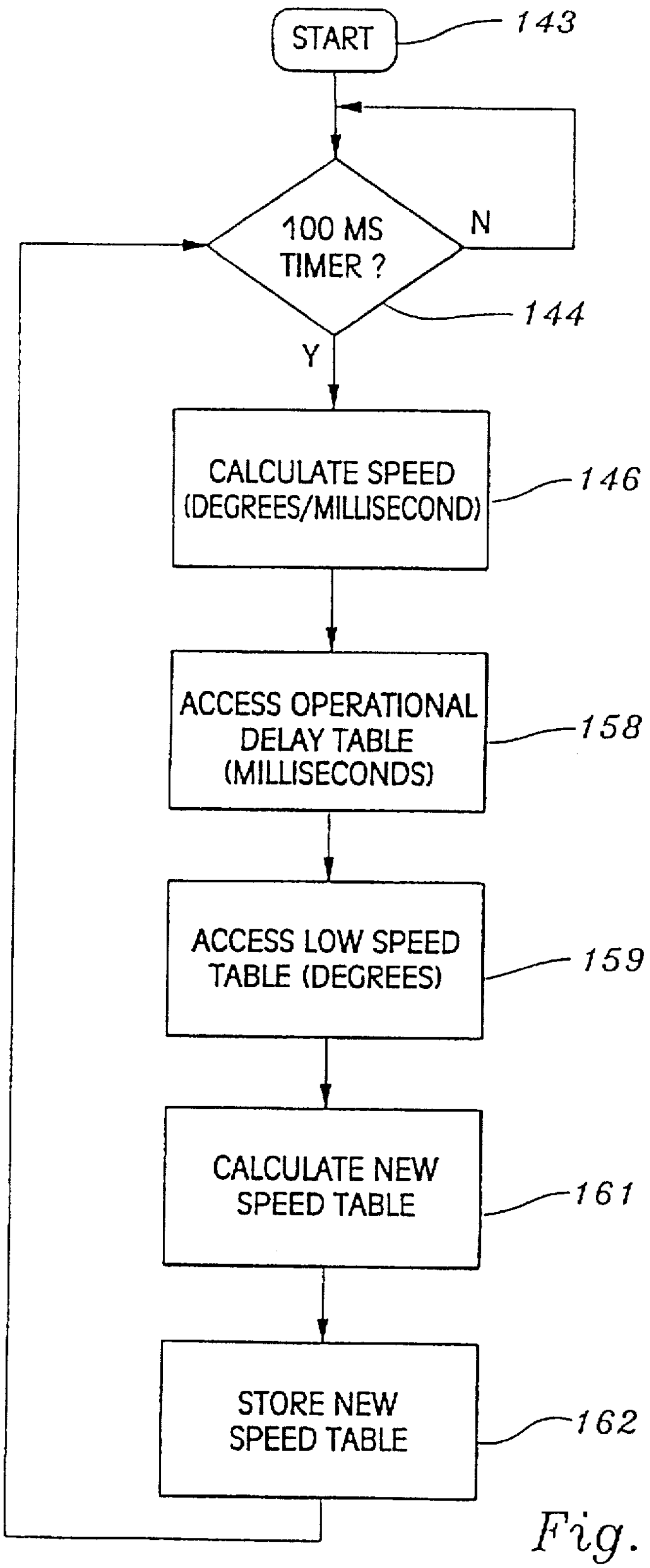
FIG. 12 is a flow chart illustrating the adaptive speed control feature of the present invention, using repetitively calculated speed tables.

An alternative method exists, for accomplishing substantially the same result as using predetermined speed tables. A flow chart illustrating that method is shown in FIG. 12. In this method, repetitive calculations are made, at approximate 100 ms intervals, to determine values for a speed table corresponding to an actual machine speed, just calculated. Then, the speed table is accordingly updated with new values, in the event that the machine speed changes. This method has the advantage of determining precise values, for each operational speed. It has the disadvantage, however, of requiring the CPU to make repetitive calculations, with the result of possible slower response time for other operations controlled by the computer.

As with the first method, at the start 143, a 100 ms timer 144 is enabled by the computer. For a period of 100 ms, the computer samples the output of the optical encoder 106, and then calculates 146 the machine's operating speed. Then, the computer accesses 158 the previously determined operational delay table, including electro-mechanical delay data for each of the twelve stations/sub-assemblies. Next, the computer accesses 159 the previously determined low speed table, having "on" and "off" control pulse angles. Using the actual machine speed, the delay data, and the low speed table, the computer calculates 161 a new speed table. Finally, the computer stores 162 this new speed table, which is updated as necessary, should the speed of the machine change.

It will be appreciated then, that we have disclosed improvements in a "Phillipsburg-type" inserter machine including an adaptive control system and method, providing efficient operation over a wide range of speeds.

It will be understood that various details of the invention may be changed without departing from the scope of the invention. Furthermore, the foregoing description is for the purpose of illustration only, and not for the purpose of limitation, as the present invention is defined by the following, appended claims.

What is claimed is:

1. A method for adaptively controlling a mail inserter machine running at different speeds, the inserter having an operational cycle and including a plurality of sub-assemblies, at least one of the sub-assemblies including a component driven in reciprocating fashion by a driver, comprising the steps of:

(a) storing a low speed table, including on and off times for an electrical control signal for the driver during the operational cycle;

(b) storing an operational delay table, corresponding to electro-mechanical lag times for the driver to complete extension and retraction of mechanical travel, in driving the component;

(c) calculating an operational speed for the inserter;

(d) accessing said low speed table and said operational delay table, and calculating a new speed table adapted to the operational speed.

2. A method as in claim 1 further including the steps of (e) storing the new speed table, and (f) using the new speed table in producing a new control signal for said driver.

3. A method as in claim 2, further including thè step of carrying out steps (c) through (f) in repetitive fashion.

4. A method for adaptively controlling a mail inserter machine capable of running at a first low speed and a second higher speed, the inserter having an operational cycle and including a plurality of sub-assemblies, at least one of the sub-assemblies including a component driven in reciprocating fashion by a driver, comprising the steps of:

(a) storing a first speed table, including a first set of on and off times for an electrical control signal for the driver during the operational cycle;

(b) storing a second speed table, including a second set of on and off times for said control signal, said second speed table incorporating adaptive factors, said factors being calculated by multiplying extension and retraction electro-mechanical lag times for the driver by the second speed, the adaptive factors being used to modify said first set of on and off times; and (c) calculating an operational speed for the inserter, and using the first speed table if the operational speed corresponds to the first speed, or using the second speed table if the operational speed corresponds to the second speed.

* * * * *